US012649317B2

(12) United States Patent (10) Patent No.: US 12,649,317 B2
Yonekubo et al. (45) Date of Patent: Jun. 9, 2026

(54) PROVIDING SYSTEM, PROVIDING METHOD, AND MANAGEMENT DEVICE

(71) Applicant: SEIKO EPSON CORPORATION, Tokyo (JP)

(72) Inventors: Shuji Yonekubo, Matsumoto (JP); Shigenori Nakagawa, Tatsuno-machi (JP); Yoshihisa Horikawa, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 206 days.

(21) Appl. No.: 18/449,918

(22) Filed: Aug. 15, 2023

(65) Prior Publication Data

US 2024/0059073 A1 Feb. 22, 2024

(30) Foreign Application Priority Data

Aug. 18, 2022 (JP) ................................. 2022-130449

(51) Int. Cl.
*G06Q 30/0283* (2023.01)
*B41J 2/175* (2006.01)
*G06K 15/00* (2006.01)

(52) U.S. Cl.
CPC ...... *B41J 2/17566* (2013.01); *G06K 15/4075* (2013.01); *B41J 2002/17569* (2013.01); *G06Q 30/0283* (2013.01)

(58) Field of Classification Search
CPC ........ B41J 2002/17569; B41J 2/17566; G06K 15/4075; G06Q 30/0283
See application file for complete search history.

(56) References Cited

U.S. PATENT DOCUMENTS

| | | | |
|---|---|---|---|
| 10,717,307 B2 | 7/2020 | Ishii | |
| 2002/0191039 A1* | 12/2002 | Minowa | ............... B41J 2/17566 |
| | | | 347/7 |
| 2016/0121635 A1* | 5/2016 | Takata | .................... B41J 2/175 |
| | | | 347/19 |
| 2019/0224995 A1 | 7/2019 | Ishii | |

FOREIGN PATENT DOCUMENTS

| | | | |
|---|---|---|---|
| JP | 2007308273 A | * | 11/2007 |
| JP | 2008-114395 A | | 5/2008 |
| JP | 2019-126944 A | | 8/2019 |

* cited by examiner

*Primary Examiner* — Jason S Uhlenhake

(74) *Attorney, Agent, or Firm* — WORKMAN NYDEGGER

(57) ABSTRACT

A cartridge providing system includes a printer ejecting a liquid (recording material) supplied from a cartridge, and a server managing provision of the cartridge to users that use the printer. Based on user stock data of each of the users, the server determines whether an unused stock, which is a stock that remains unused for a first period or longer from a start of holding, is present in a stock of the cartridges held by each of the users. If it is determined that an unused stock is present in the stock held by a first user, when a period until a usage expiry date of the unused stock is less than a first threshold value, the server sets a collection recommendation flag to the unused stock in the user stock data of the first user, the collection recommendation flag indicating the cartridge recommended for collection.

8 Claims, 9 Drawing Sheets

PROVIDING SYSTEM, PROVIDING METHOD, AND MANAGEMENT DEVICE

The present application is based on, and claims priority from JP Application Serial Number 2022-130449, filed Aug. 18, 2022, the disclosure of which is hereby incorporated by reference herein in its entirety.

BACKGROUND

1. Technical Field

The present disclosure relates to a providing system, a providing method, and a management device that provide a recording material to a user that uses a recording device.

2. Related Art

In JP-A-2008-114395, technology is described for reducing an amount of ink that is wastefully discarded due to passing a usage expiry date, in an inkjet recording device that performs printing (recording) using inks of four colors of cyan, magenta, yellow, and black, which are examples of a recording material. Specifically, the inkjet recording device described in JP-A-2008-114395 determines which of the inks is to be preferentially used, based on a time until the usage expiry date of each of the inks. For example, when the black ink is to be preferentially used, in print data, mixed color dots in which the three color inks of cyan, magenta, and yellow are arranged in an overlapping manner are replaced with dots of the black ink. On the other hand, when the ink other than the black ink is to be preferentially used, in the print data, dots of the black ink are replaced with mixed color dots.

However, when this type of replacement is performed, strictly speaking, the printing is performed using a color different from an assumed color, and therefore, print quality may sometimes deteriorate. In other words, when the printing is performed with priority given to the print quality, it is not possible to reduce the amount of ink that is wastefully discarded.

SUMMARY

A providing system includes a recording device configured to perform recording by applying a recording material to a medium, and a management device configured to manage provision of the recording material to a plurality of users that use the recording device. The management device manages user stock data for each of the plurality of users, the user stock data being data in which a stock of the recording material held by the plurality of users is associated with a usage expiry date of the recording material. The management device determines, based on the user stock data of each of the plurality of users, whether an unused recording material is present in the stock of the recording material held by each of the plurality of users, the unused recording material being the recording material remaining unused for a first period or longer from a start of holding of the recording material. In a case in which it is determined that the unused recording material is present in the stock of the recording material held by a first user of the plurality of users, when a period until a usage expiry date of the unused recording material is less than a first threshold value, the management device sets a collection recommendation flag to the unused recording material in the user stock data of the first user, the collection recommendation flag indicating the recording material recommended for collection.

A providing method is a providing method of providing a recording material to a plurality of users that use a recording device, the recording device being configured to perform recording by applying the recording material to a medium. The providing method includes managing user stock data for each of the plurality of users, the user stock data being data in which a stock of the recording material held by the plurality of users is associated with a usage expiry date of the recording material, determining, based on the user stock data of each of the plurality of users, whether an unused recording material is present in the stock of the recording material held by each of the plurality of users, the unused recording material being the recording material remaining unused for a first period or longer from a start of holding of the recording material, and, in a case in which it is determined that the unused recording material is present in the stock of the recording material held by a first user of the plurality of users, when a period until a usage expiry date of the unused recording material is less than a first threshold value, setting a collection recommendation flag to the unused recording material in the user stock data of the first user, the collection recommendation flag indicating the recording material recommended for collection.

A management device is a management device for managing provision of a recording material to a plurality of users that use a recording device, the recording device being configured to perform recording by applying the recording material to a medium. The management device manages user stock data for each of the plurality of users, the user stock data being data in which a stock of the recording material held by the plurality of users is associated with a usage expiry date of the recording material. The management device determines, based on the user stock data of each of the plurality of users, whether an unused recording material is present in the stock of the recording material held by each of the plurality of users, the unused recording material being the recording material remaining unused for a first period or longer from a start of holding of the recording material. In a case in which it is determined that the unused recording material is present in the stock of the recording material held by a first user of the plurality of users, when a period until a usage expiry date of the unused recording material is less than a first threshold value, the management device sets a collection recommendation flag to the unused recording material in the user stock data of the first user, the collection recommendation flag indicating the recording material recommended for collection.

DESCRIPTION OF EMBODIMENTS

1. First Embodiment

A cartridge providing system 1 as a providing system will be described below with reference to the accompanying drawings.

Figure 1:
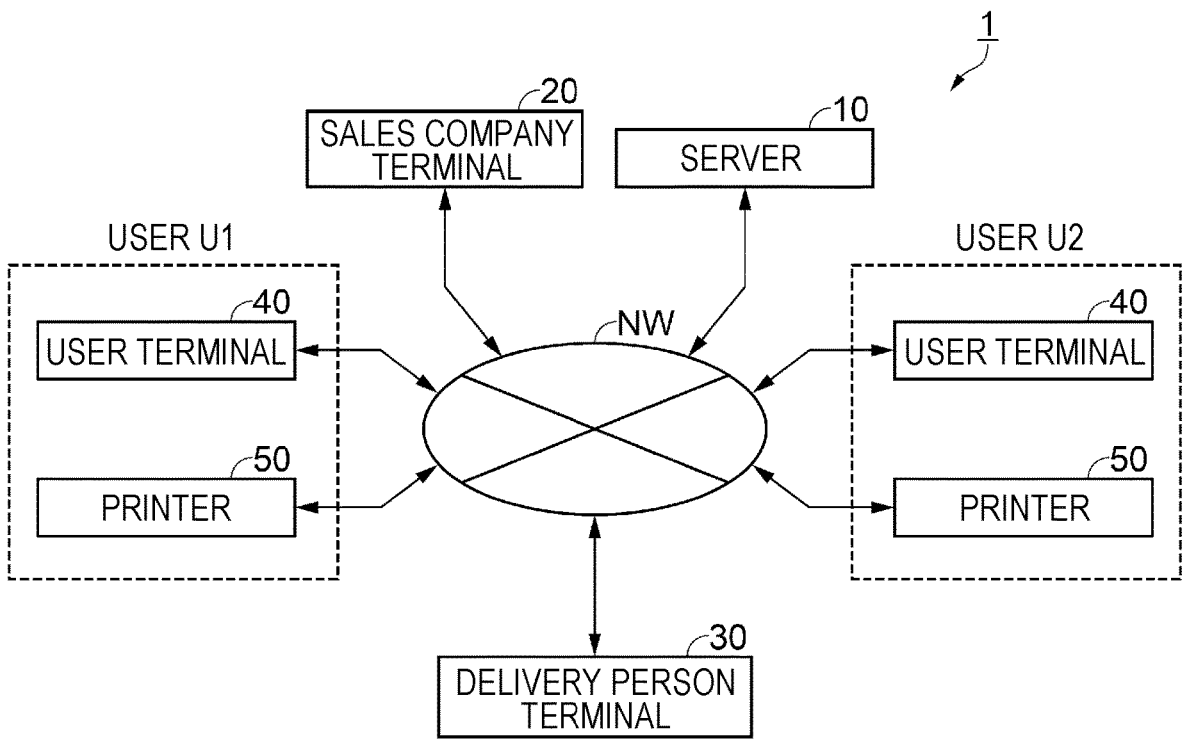
FIG. 1 is a configuration diagram illustrating an example of a schematic configuration of a cartridge providing system.

FIG. 1 is a configuration diagram illustrating an example of a schematic configuration of the cartridge providing system 1 according to an embodiment.

As illustrated in FIG. 1, the cartridge providing system 1 includes a server 10, a sales company terminal 20, a delivery terminal 30, one or a plurality of user terminals 40, and one or a plurality of printers 50, which are coupled to each other via a network NW such as the Internet.

The printers 50 are disposed at a location of one or plurality of users that have concluded a predetermined maintenance contract with a sales company, and are used by the respective users. Further, the user terminal 40 is coupled for each of these users. In FIG. 1, the user terminals 40 and the printers 50 respectively used by a user U1 and a user U2 corresponding to the one or plurality of users are illustrated. A cartridge 60 (see FIG. 2) storing a liquid such as ink is mounted to the printer 50, and the printer 50 performs printing using the liquid supplied from the cartridge 60. Further, the server 10 manages provision of the cartridge 60 to the user, collection of the cartridge 60 from the user, and the like. It should be noted that the cartridge 60 storing the liquid may also be simply referred to as the liquid. The liquid corresponds to a recording material. Therefore, the cartridge 60 may also be simply referred to as the recording material. The recording material may be a solid toner or a liquid toner used in an electrophotographic recording device. In this case, the cartridge 60 is a toner cartridge.

The sales company terminal 20 is a terminal device managed by a sales company selling the cartridge 60, that is, a vendor, and is operated by a salesperson in charge of sales. In the embodiment, the salesperson is also responsible for managing the provision and collection of the cartridges 60. The delivery terminal 30 is a terminal device operated by a person in charge of delivery of a delivery company delivering the cartridge 60 to the user, and is carried by the person in charge of delivery when the cartridge 60 is delivered to the user from a warehouse in which the stock of the cartridges 60 is stored. The delivery company or the person in charge of delivery corresponds to a deliverer. The user terminal 40 is a terminal device operated by the user managing the printer 50. The user terminal 40 may manage warehousing and shipping of the cartridges 60 to and from the user. The warehousing and shipping of the cartridges 60 may be automatically managed by a known device including a barcode scanner that reads a barcode attached to the cartridge 60. Alternatively, the user may manually input updated stock information to management software that is software for managing the warehousing and shipping of the cartridges 60 and is installed in the user terminal 40. Hereinafter, the sales company terminal 20, the delivery terminal 30, and the user terminal 40 are also referred to as the terminal devices 20, 30, and 40, respectively. The server 10 is an information processing device forming the core of the cartridge providing system 1, and the server 10 receives an input of information from each of the terminal devices 20, 30, and 40 and the printer 50, and performs processing in accordance with the input. The server 10 outputs various information to each of the terminal devices 20, 30, and 40.

The cartridge providing system 1 according to the embodiment manages the stock of the cartridges 60 held by the user together with the stock of the cartridges 60 held by the sales company, in order to suppress wasting of unused cartridges 60 due to the passing of the usage expiry date. According to the cartridge providing system 1, the sales company of the cartridge 60 can provide the appropriate cartridge 60 to the user, based on the usage expiry dates and the like of the cartridges 60 held as stock by the sales company and the user.

Hereinafter, each of the devices constituting the cartridge providing system 1 will be described in detail.

Figure 2:
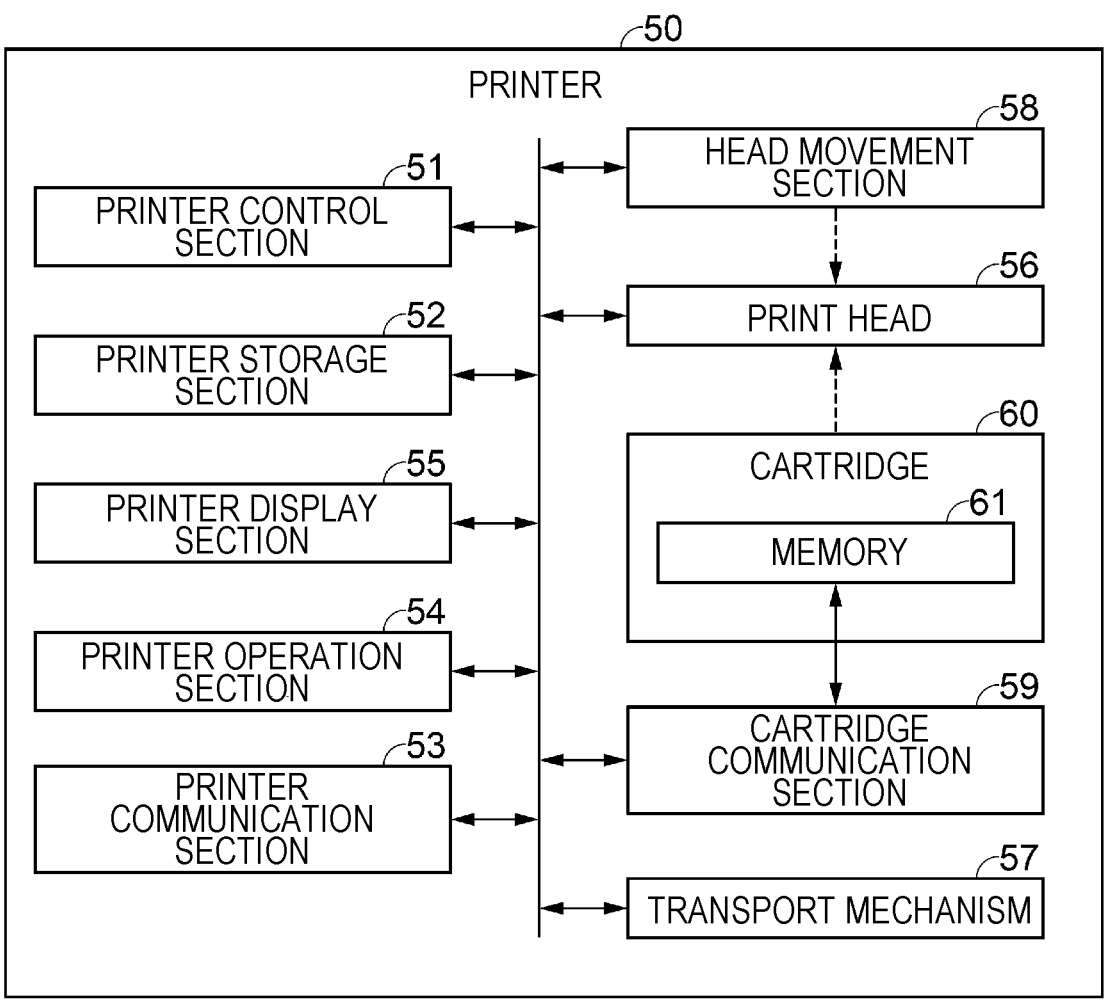
FIG. 2 is a block diagram illustrating an internal configuration of a printer.

FIG. 2 is a block diagram illustrating an internal configuration of the printer 50.

As illustrated in FIG. 2, the printer 50 includes a printer control unit 51, a printer storage unit 52, a printer communication unit 53, a printer operation unit 54, a printer display unit 55, a printing head 56, a transport mechanism 57, a head moving unit 58, and a cartridge communication unit 59. In the embodiment, the printer 50 is an inkjet type image forming device (a liquid ejecting device) that forms an image, that is, performs printing, by ejecting ink that is a liquid from the printing head 56. In other words, the printer 50 corresponds to a recording device that performs recording by applying a recording material to a printing medium (not illustrated) as a medium.

The printer control unit 51 is configured to include a processor such as a central processing unit (CPU), and controls the operation of the printer 50 by operating in accordance with a program (not illustrated) stored in the printer storage unit 52.

The printer storage unit 52 is constituted by a storage device such as a hard disk drive, a solid-state drive (SSD), or a memory, and stores the above-described program, various setting data, and the like.

The printer communication unit 53 includes various interface circuits for performing communication with an external device. The printer communication unit 53 of the embodiment includes an interface circuit for performing communication via the network NW.

The printer operation unit 54 is constituted by operation buttons and the like, receives an input operation performed by the user, and transmits, to the printer control unit 51, information relating to various commands from the user. The printer display unit 55 is constituted by a liquid crystal display, an organic electro luminescence (EL) display, a light-emitting diode (LED), or the like, and displays information based on the control of the printer control unit 51 or the like. Note that the printer operation unit 54 may be integrated with the printer display unit 55, as in a touch panel.

A plurality of nozzles (not illustrated) for ejecting the ink are formed in the printing head 56. Based on the control of the printer control unit 51, the printing head 56 ejects the liquid supplied from the one or the plurality of cartridges 60 mounted to the printer 50, onto the printing medium. Note that the cartridges 60 storing the inks of each of the colors of cyan, magenta, yellow, black, and the like, the cartridge 60 storing a treatment liquid that coagulates or thickens a component of the ink, or the like may be mounted to the printer 50, for example. The processing liquid is ejected onto the printing medium before or after the ejection of the ink, when the printing medium is fabric or the like.

Based on the control of the printer control unit 51, the transport mechanism 57 transports the printing medium set in the printer 50 in a predetermined transport direction, so that the printing medium passes through a position at which the ink is ejected by the printing head 56. Under the control of the printer control unit 51, the head moving unit 58 causes the printing head 56 to reciprocate in a main scanning direction intersecting the transport direction.

The printer control unit 51 forms a raster line in which dots are arranged along the main scanning direction on the printing medium, by performing main scanning in which the ink is ejected from the nozzles of the printing head 56 while moving the printing head 56 in the main scanning direction. Further, the printer control unit 51 can eject the ink over a wide range of the printing medium by alternately performing the main scanning and sub-scanning in which the printing medium is moved along the transport direction. The printer control unit 51 controls the above-described operation based on the print data supplied from the user terminal 40, another computer (not illustrated), or the like, thereby forming an image based on the print data on the printing medium.

A nonvolatile memory 61 is attached to each of the cartridges 60, and the memory 61 stores identification information for identifying the individual cartridge 60, type information indicating the type of liquid stored in the cartridge 60, usage information indicating a usage amount of the liquid from a start of use of the cartridge 60, expiration information indicating the usage expiry date of the cartridge 60, and the like. The identification information is information for identifying the individual cartridge 60 and updating user stock data 31 to be described later, and may include, for example, information relating to at least one of a product name, a manufacturing individual number, a manufacturing lot number, a manufacturer name, or a manufacturing factory number of the cartridge 60. The type information may include information relating to at least one of the color, a dye, or a pigment of the liquid stored in the cartridge 60. The expiration information may include date information relating to the usage expiry date of the cartridge 60.

The cartridge communication unit 59 is coupled to a coupling terminal (not illustrated) provided in the memory 61 of the cartridge 60. Then, it is possible to read information from the memory 61 and update information stored in the memory 61 based on the control of the printer control unit 51. Each time the printing is executed, for each of the cartridges 60, the printer control unit 51 adds a usage amount for a current time of printing to the usage amount of the liquid indicated by the usage information stored in the memory 61, and updates the usage information. Then, when the usage amount indicated by the updated usage information exceeds a predetermined threshold, a message indicating that replacement of the cartridge 60 is necessary is displayed on the printer display unit 55.

Note that of the information stored in the memory 61 of the cartridge 60, the identification information, the type information, and the expiration information are also described on a package of the cartridge 60. Thus, the user can recognize the identification information, the type information, and the expiration information by looking at the package. Of these pieces of information, at least the identification information may be written on the package in the form of a bar code or the like. In this case, the individual cartridge 60 can be identified by reading the bar code or the like. Further, in this case, the identification information, the type information, and the expiration information may be represented by different one-dimensional codes, or all of the identification information, the type information, and the expiration information may be represented by a single two-dimensional code.

Figure 3:
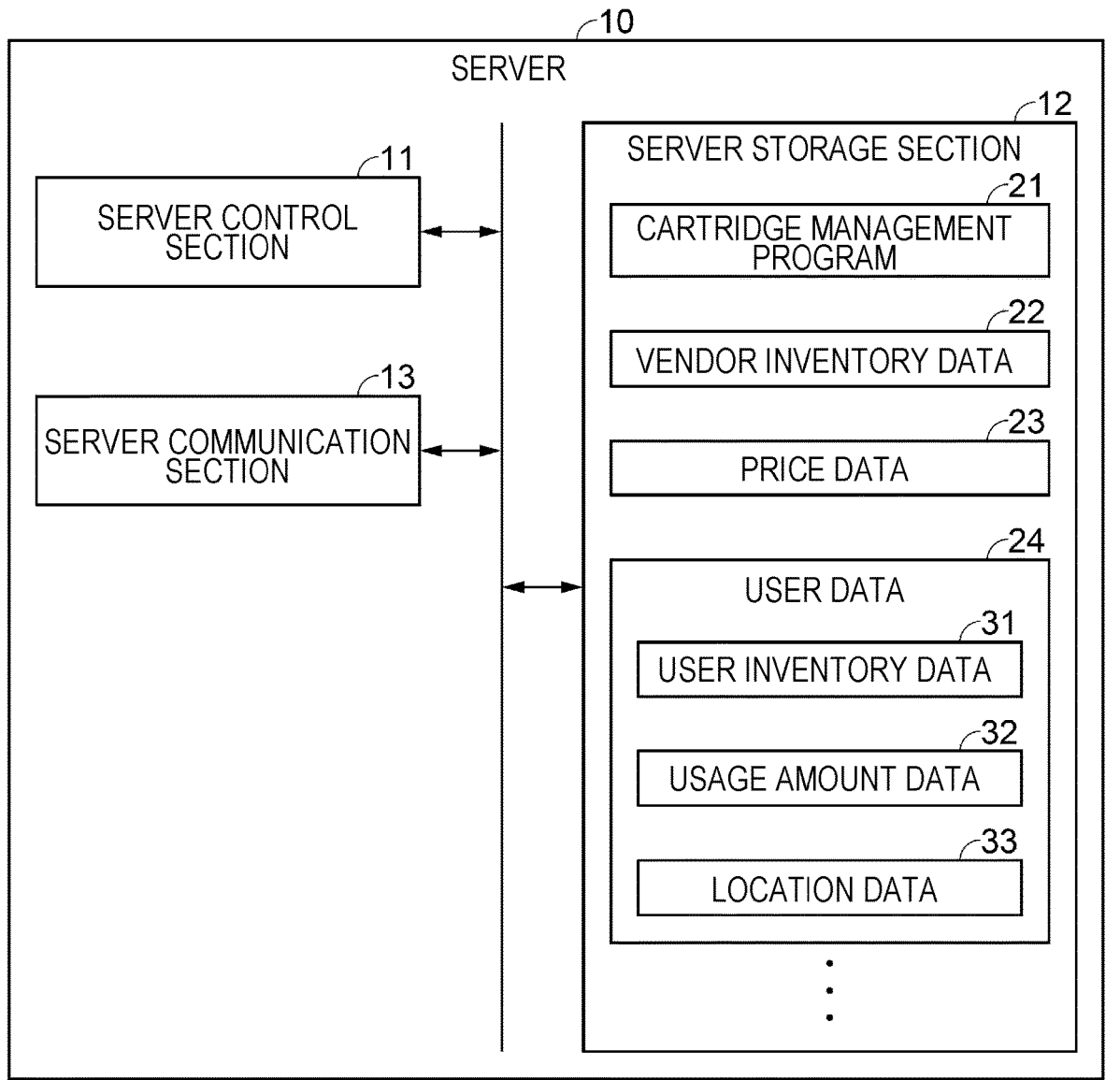
FIG. 3 is a block diagram illustrating an internal configuration of a server.

FIG. 3 is a block diagram illustrating an internal configuration of the server 10.

As illustrated in FIG. 3, the server 10 is constituted by a general-purpose computer, for example, and includes a server control unit 11, a server storage unit 12, and a server communication unit 13. The server storage unit 12 and the server communication unit 13 are coupled to the server control unit 11 via a bus or the like.

The server control unit 11 is configured to include a processor such as a CPU, and a memory such as a random-access memory (RAM) or a read only memory (ROM). The server control unit 11 operates in accordance with an operating system (OS) and various application programs (not illustrated) stored in the server storage unit 12, thus controlling the operation of the server 10 and executing various operations in response to requests from the terminal devices 20, 30, and 40, and the printer 50, which are clients.

The server storage unit 12 is constituted by a storage device such as a hard disk drive or an SSD, and stores the above-described OS, various application programs, and the like. The application programs stored in the server storage unit 12 include a cartridge management program 21 for managing the provision and collection of the cartridge 60. Further, the server storage unit 12 of the embodiment stores vendor stock data 22 in which is registered the stock of the cartridges 60 held by the sales company, that is, the stock of the cartridges 60 stored in the warehouse of the sales company, and price data 23 in which the prices of the cartridges 60 are recorded. Furthermore, the server storage unit 12 stores user data 24 for each of the users that have concluded the maintenance contract.

The user data 24 includes the user stock data 31 in which is registered the stock of the cartridges 60 held by the user, usage data 32 indicating the usage amount of the cartridge 60 for each of the types of liquid in the printer 50, such as for each color of the liquid, for example, and location data 33 indicating the location of the user. Note that each of the user stock data 31, the usage data 32, and the location data 33 relating to a single user is associated with an identifier for identifying the single user. In other words, the user stock data 31, the usage data 32, and the location data 33 relating to the single user are associated with each other using the identifier for identifying the user.

Note that, in the embodiment, the stock of the cartridges 60 held by the user is the stock stored at the location of the user where the printer 50 is installed or at a warehouse or the like in the vicinity of the location, but the ownership of the cartridges 60 belongs to the vendor, namely, the sales company. Thus, the sale is not concluded when the sales company delivers the cartridge 60 to the location of the user, but the sale is concluded at a point in time at which the user mounts the cartridge 60 stored as stock at the location of the user or the like to the printer 50.

As described above, in the vendor stock data 22 and the user stock data 31, the stock of the cartridges 60 held by the sales company and the user are respectively registered. Specifically, in the vendor stock data 22 and the user stock data 31, the identification information for identifying the individual cartridge 60 that is part of the stock is registered, and each of the identification information is associated with the type information indicating the type of liquid and the expiration information indicating the usage expiry date. Thus, by referring to the vendor stock data 22 and the user stock data 31, the server 10 can recognize a stock amount for each of the types of liquid and can also recognize a stock amount for each of the usage expiry dates, for each of the stocks of the sales company and the user. Further, each of the identification information registered in the user stock data 31 is associated with holding start information indicating a holding start date, so that it is possible to recognize from when the stock is held by the user.

The price data 23 is a table in which a time elapsed from a time when the cartridge 60 was manufactured and the price of the cartridge 60 are associated with each other.

Specifically, in replacing the cartridge 60, when there is a plurality of the cartridges 60 of the same type as the cartridge 60 that is the replacement target, the longer the elapsed time, in other words, the shorter the time until the usage expiry date, the lower the price set in the price data 23, so that the user selects the cartridge 60 having the shorter time until the usage expiry date.

Further, the usage amount data 32 is data indicating the usage amount of the liquid within a certain period. In other words, the usage amount data 32 is data indicating the usage amount or a usage record of the liquid in the printer 50. Thus, the usage amount data 32 may also be referred to as usage record data. In the usage amount data 32, a transition over time of the usage amount of the liquid is recorded by aggregating the usage amounts at each of a plurality of points in time from the past to the present. In the embodiment, the usage amount data 32 is data indicating a number of times the cartridge 60 is replaced per month, and the number of times of replacement is aggregated for each of the types of liquid. Then, in the usage amount data 32, a transition in the number of times of replacement over a few months up to the present is recorded for each of the types of liquid. In the embodiment, a value of the number of times of replacement is the same as a value of the number of the cartridges 60 used per month. For example, when the number of the cartridges 60 used per month is two, the number of times of replacement of the cartridge 60 used per month is two. Note that the number of times of replacement may be calculated so as to be different from the number of the cartridges 60 used per month. For example, when, in the course of one month, the removal of the cartridge 60 from the printer 50 and the attachment of a new cartridge 60 of the same type to the printer 50 is considered to be one "replacement" operation, the number of the cartridges 60 used per month is two and the number of times of replacement is one.

The server communication unit 13 includes various interface circuits for performing communication with an external device. The server communication unit 13 of the embodiment includes an interface circuit for performing communication via the network NW, and can perform communication with each of the terminal devices 20, 30, and 40, and the printer 50 via the network NW.

In a state in which the cartridge management program 21 is activated, the server control unit 11 manages the vendor stock data 22, the price data 23, the user stock data 31, the usage amount data 32, and the location data 33 stored in the server storage unit 12. Further, when there is the plurality of users, the server control unit 11 manages the user stock data 31, the usage amount data 32, and the location data 33 for each of the plurality of users. Here, "managing" includes reading out and using or updating these data. Further, the server storage unit 12 need not necessarily be integrated with the server 10, and may be constituted by an external storage device that can be accessed from the server 10 via the network NW. In other words, it is sufficient that the server 10 includes at least the server control unit 11 and the server communication unit 13. Since the server 10 includes the server control unit 11 that manages the various data described above, the server 10 corresponds to the management device.

Figure 4:
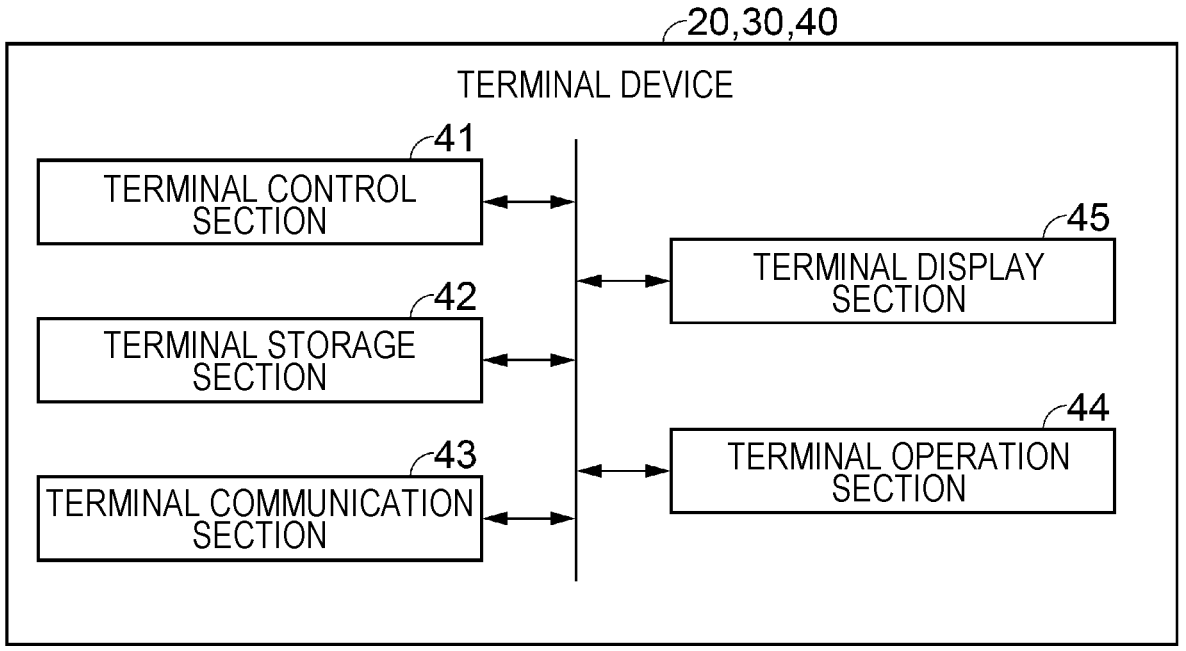
FIG. 4 is a block diagram illustrating an internal configuration of a terminal device.

FIG. 4 is a block diagram illustrating an internal configuration of each of the terminal devices 20, 30, and 40.

As illustrated in FIG. 4, each of the terminal devices 20, 30, and 40 is constituted by a personal computer, a tablet type mobile terminal, or the like. The terminal device 20, 30, or 40 includes a terminal control unit 41, a terminal storage unit 42, a terminal communication unit 43, a terminal operation unit 44, and a terminal display unit 45.

The terminal control unit 41 is configured to include a processor such as a CPU, and a memory such as a RAM or a ROM, and controls the operation of the terminal device 20, 30, or 40 by operating in accordance with an OS or various application programs (not illustrated) stored in the terminal storage unit 42. The terminal storage unit 42 is constituted by a storage device such as a hard disk drive, an SSD, or a memory, and stores various data and the like in addition to the above-described OS and various application programs. The terminal communication unit 43 includes various interface circuits for performing communication with an external device. The terminal communication unit 43 of the embodiment includes an interface circuit for performing communication via the network NW.

The terminal operation unit 44 is constituted by a keyboard, a pointing device, and the like, receives an input operation performed by each of the persons in charge or the user, and transmits the input operation to the terminal control unit 41. The terminal display unit 45 is constituted by a liquid crystal display, an organic EL display, or the like, and displays information based on the control of the terminal control unit 41 or the like. Note that the terminal operation unit 44 may be integrated with the terminal display unit 45, as in a touch panel. Further, as in a desktop computer, the terminal operation unit 44 and the terminal display unit 45 may be separated from the main body of the terminal device 20, 30, or 40.

Note that, as described above, the terminal device 20, 30, or 40 may be a desktop or a notebook personal computer, or may be a mobile terminal. It should be noted that, since the delivery terminal 30 is the terminal device carried by the person in charge of delivery at the time of delivery, it is assumed that the delivery terminal 30 is the mobile terminal. Further, each of the terminal devices 20, 30, and 40 is not limited to a general-purpose device, and may be a device dedicated to the cartridge providing system 1.

Next, a providing method of the cartridge 60 by the cartridge providing system 1 will be described.

Figure 5:
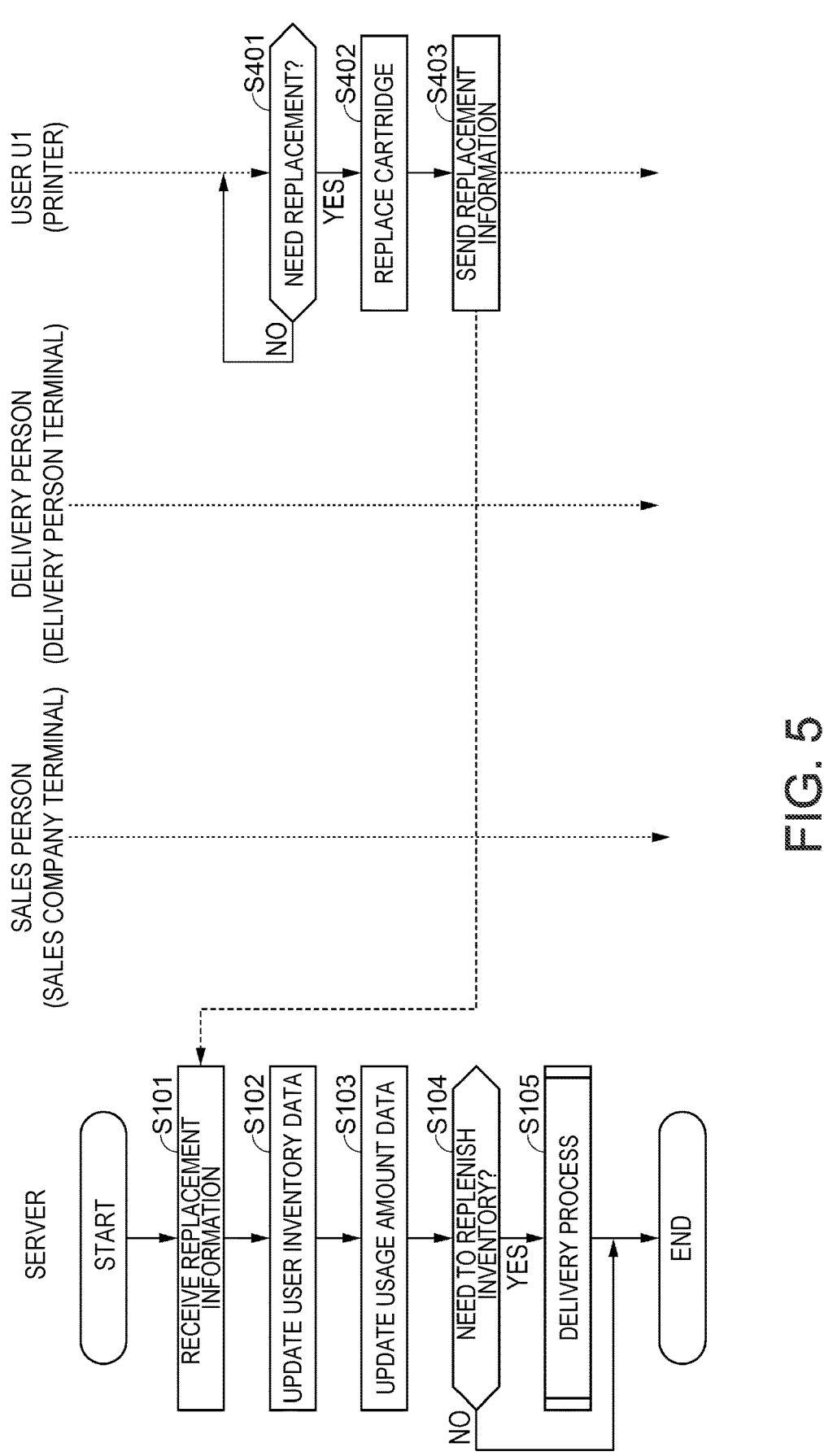
FIG. 5 is a flowchart for describing a cartridge providing method.
Figure 6:
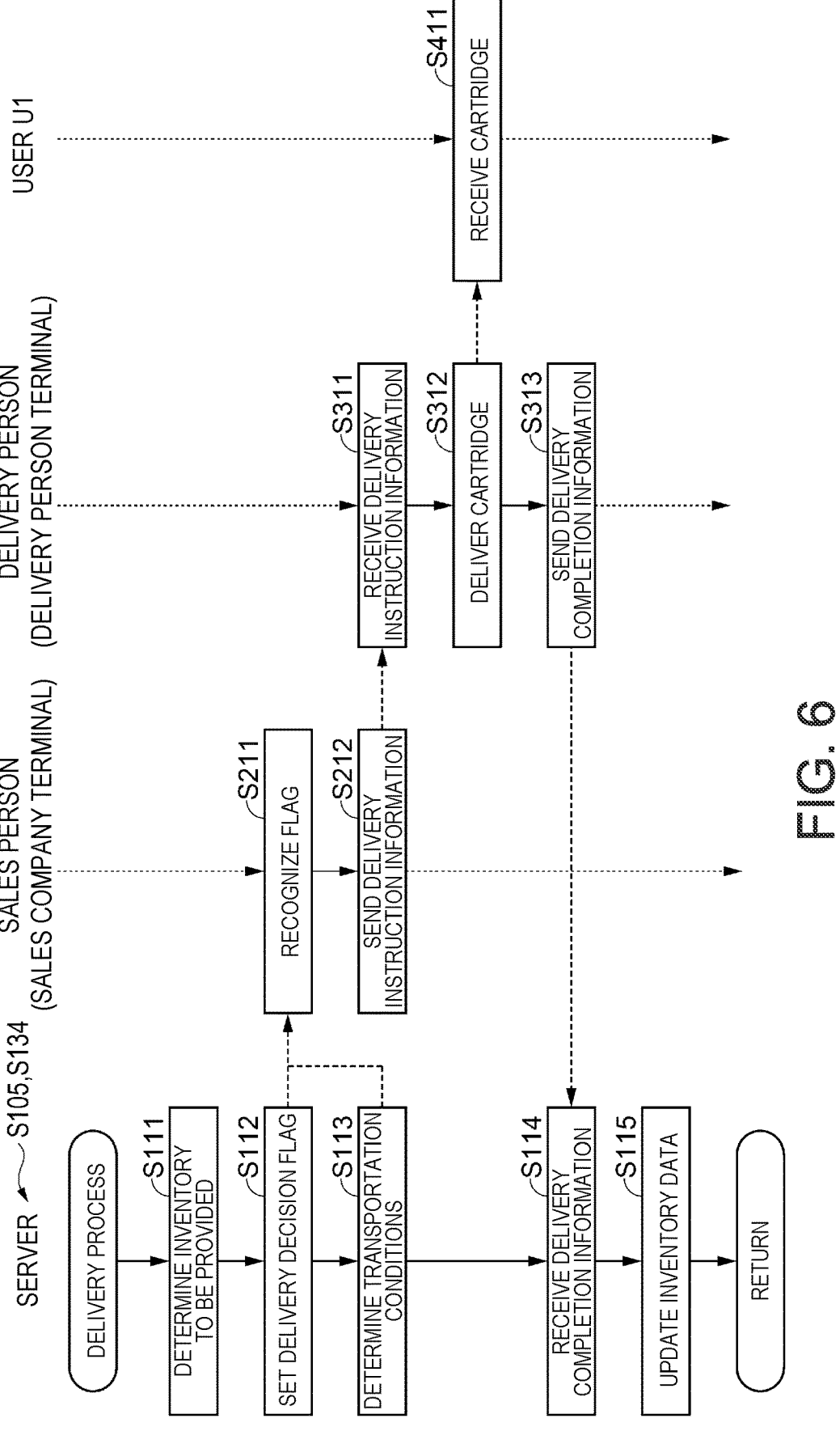
FIG. 6 is a flowchart for describing delivery processing.

FIG. 5 is a flowchart for describing the providing method of the cartridge 60, and FIG. 6 is a flowchart for describing delivery processing included in the providing method of the cartridge 60. These flowcharts include steps S101 to S115 indicating operations of the server 10, steps S211 to S212 indicating operations of the salesperson of the sales company and the sales company terminal 20, and steps S311 to S313 indicating operations of the person in charge of delivery at the delivery company and the delivery terminal 30. Further, the flowcharts include steps S401 to S411 indicating operations of the user U1, and operations of the printer 50 of the user U1, of the one or the plurality of users.

As illustrated in FIG. 5, the user U1 using the printer 50 determines whether the replacement of any of the cartridges 60 is necessary based on a message displayed on the printer display unit 55 (step S401). Then, when it is not necessary to replace any of the cartridges 60 (step S401: NO), this step S401 is repeated while continuing the use of the printer 50.

On the other hand, when it is necessary to replace any one of the cartridges 60 (step S401: YES), that is, when a message indicating that it is necessary to replace the cartridge 60 is displayed on the printer display unit 55, the user U1 replaces the cartridge 60 (step S402). Specifically, the user U1 removes, from the printer 50, the cartridge 60 that is the replacement target from among the cartridges 60 mounted to the printer 50. Then, of the cartridges 60 held as stock, the cartridge 60 of the same type as the cartridge 60 that is the replacement target is mounted to the printer 50. At this time, when the plurality of cartridges 60 in stock are of the same type as the cartridge 60 that is the replacement target, the user U1 selects the cartridge 60 having the shortest period until the usage expiry date and mounts the selected cartridge 60 to the printer 50.

When the cartridge 60 is replaced by the user U1, using the cartridge communication unit 59, the printer control unit 51 reads out the identification information and the type information from the memory 61 of the newly mounted cartridge 60. Then, the printer control unit 51 transmits the read identification information and type information from the printer communication unit 53 to the server 10 as replacement information indicating that the cartridge 60 has been replaced (step S403).

Using the server communication unit 13, the server control unit 11 of the server 10 receives the replacement information transmitted from the printer 50 of the user U1 (step S101). Based on the identification information of the cartridge 60 included in the received replacement information, the server control unit 11 recognizes the individual cartridge 60 mounted to the printer 50, and updates the user stock data 31 of the user U1 (step S102), so that the number of the cartridges 60 in stock of the same type as the cartridge 60 that is the replacement target is reduced by one, by deleting the mounted cartridge 60 from the stock registered in the user stock data 31 of the user U1. Note that initial data of the user stock data 31 may be acquired by the server control unit 11 by being provided from the user to the sales company. The initial data of the user stock data 31 is data indicating a state of the stock at a point in time at which the user introduces the cartridge providing system 1.

Further, based on the received replacement information, the server control unit 11 updates the usage amount data 32 indicating the usage amount of the cartridge 60 (step S103). Specifically, for the type indicated by the type information included in the received replacement information, the server control unit 11 adds one to the number of times of replacement for that month.

Next, in accordance with the stock of the user U1 being reduced by one, based on the user stock data 31 and the usage amount data 32 of the user U1, the server control unit 11 determines whether it is necessary to replenish the stock, that is, to provide the cartridge 60 (step S104). For example, the server control unit 11 derives an appropriate stock amount to be held by the user U1 based on the usage amount data 32 of the user U1, and determines that it is necessary to provide the cartridge 60 when the stock amount based on the user stock data 31 is less than the appropriate stock amount. When it is determined that it is necessary to provide the cartridge 60 (step S104: YES), the server control unit 11 executes the delivery processing (step S105) to be described later, and when it is determined that it is not necessary to provide the cartridge 60 (step S104: NO), the server control unit 11 ends the flow. Note that, at step S104, instead of the server control unit 11, the user U1 may determine whether it is necessary to replenish the stock. When the user U1 determines that it is necessary to replenish the stock, for example, the user U1 inputs order information for ordering the cartridge 60 to the user device 40 of the user U1. Then, the order information is transmitted to the server 10 via the network NW.

Next, the delivery processing (step S105) will be described in detail with reference to FIG. 6.

As illustrated in FIG. 6, first, the server control unit 11 determines the cartridge 60 to be provided to the user U1 from the stock held by the sales company, based on the vendor stock data 22, and on the user stock data 31, the usage amount data 32, and the location data 33 of the user U1 (step S111). Specifically, the server control unit 11 determines the cartridge 60 of which usage expiry date should be provided from among the stock held by the sales company. For example, the server control unit 11 determines that the cartridge 60 having a relatively long period until the usage expiry date should be provided to the user having a relatively small monthly usage amount, so that the cartridge 60 is not wasted as a result of not being used by the usage expiry date. On the other hand, the server control unit 11 may determine that the cartridge 60 having a relatively short period until the usage expiry date should be provided to the user having a relatively large monthly usage amount. Further, taking into consideration a time required for transportation, the server control unit 11 determines that the cartridge 60 having a relatively long period until the usage expiry date should be provided to the user having a location of which the distance from the warehouse where the stock of the sales company is stored is relatively long.

Once the usage expiry date of the cartridge 60 to be provided is determined, in the vendor stock data 22, the server control unit 11 sets, for one of the cartridges 60 having the determined usage expiry date, at least one of a delivery determination flag or a delivery determination code indicating that this is the cartridge 60 to be delivered (step S112), and also assigns at least one of the identifier or an identification code indicating the user at the delivery destination. The delivery determination flag and the delivery determination code are codes for distinguishing the cartridge 60 to be delivered from the other cartridges 60. Similarly, the identifier and the identification code are codes for the server control unit 11 to recognize the user at the delivery destination.

Next, the server control unit 11 determines a transportation condition when the delivery company delivers the cartridge 60 (step S113), and assigns an identifier indicating the transportation condition to the vendor stock data 22 in association with data, namely a record, indicating the cartridge 60 to which the delivery determination flag is set. The server control unit 11 can specify low temperature transportation, "This side up," "Fragile goods", "Do not place under other goods", and the like, as the transportation conditions, and initial settings (default conditions) for these transportation conditions are determined in advance in accordance with the type of liquid. The server control unit 11 changes the transportation condition from the initial setting to an actual condition based on a timing of the delivery, the location of the user that is the delivery destination, and the period until the usage expiry date of the cartridge 60 to be delivered. For example, even in a case in which normal temperature transportation is specified in the initial setting, the transportation condition may be determined to be the low temperature transportation when at least one of the following applies: the timing of the delivery is during a hot season, the location is far away, or the period until the usage expiry date is short. Subsequently, the server control unit 11 transmits a notification, to the sales company terminal 20, indicating that the at least one of the delivery determination flag or the delivery determination code has been set.

Based on the notification from the server 10, the salesperson recognizes that the delivery determination flag has been set, that is, that there is the cartridge 60 to be delivered (step S211). Then, the salesperson accesses the server 10 from the sales company terminal 20, acquires from the vendor stock data 22 the identification information of the cartridge 60 to which the delivery determination flag is set, the identifier indicating the user at the delivery destination, and the identifier indicating the transportation condition, and, based on the acquired information, transmits delivery instruction information from the sales company terminal 20 to the delivery terminal 30 (step S212).

When the delivery terminal 30 receives the delivery instruction information from the sales company terminal 20 (step S311), the person in charge of delivery delivers the cartridge 60 to the user U1 (step S312). Specifically, the person in charge of delivery receives the specified cartridge 60 from the warehouse of the sales company and delivers the cartridge 60 to the location of the user U1 in accordance with the specified transportation condition. The user U1 receives the delivered cartridge 60 from the person in charge of delivery (step S411), and stores the cartridge 60 in a predetermined place as stock. When the delivery is completed, the person in charge of delivery transmits delivery completion information indicating that the delivery of the cartridge 60 to the user U1 is completed, from the delivery terminal 30 to the server 10 (step S313).

When the server 10 receives the delivery completion information from the delivery terminal 30 (step S114), the server control unit 11 updates the vendor stock data 22, and the user stock data 31 of the user U1 (step S115). Specifically, the server control unit 11 updates the vendor stock data 22 by deleting the cartridge 60 delivered to the user U1 from the vendor stock data 22. For example, the server control unit 11 updates the vendor stock data 22 so that the number of the cartridges 60 in stock is decreased by one for the cartridge 60 delivered to the user U1. Further, the server control unit 11 adds the delivered cartridge 60 to the user stock data 31 of the user U1, and inputs the delivery date of the cartridge 60 as the holding start date of the cartridge 60, thereby updating the user stock data 31. In this way, the delivery processing (step S105) is completed, and the server control unit 11 ends the flow after returning to the main flow illustrated in FIG. 5.

Next, of the providing method of the cartridge 60, stock management processing periodically executed by the server 10 will be described.

Figure 7:
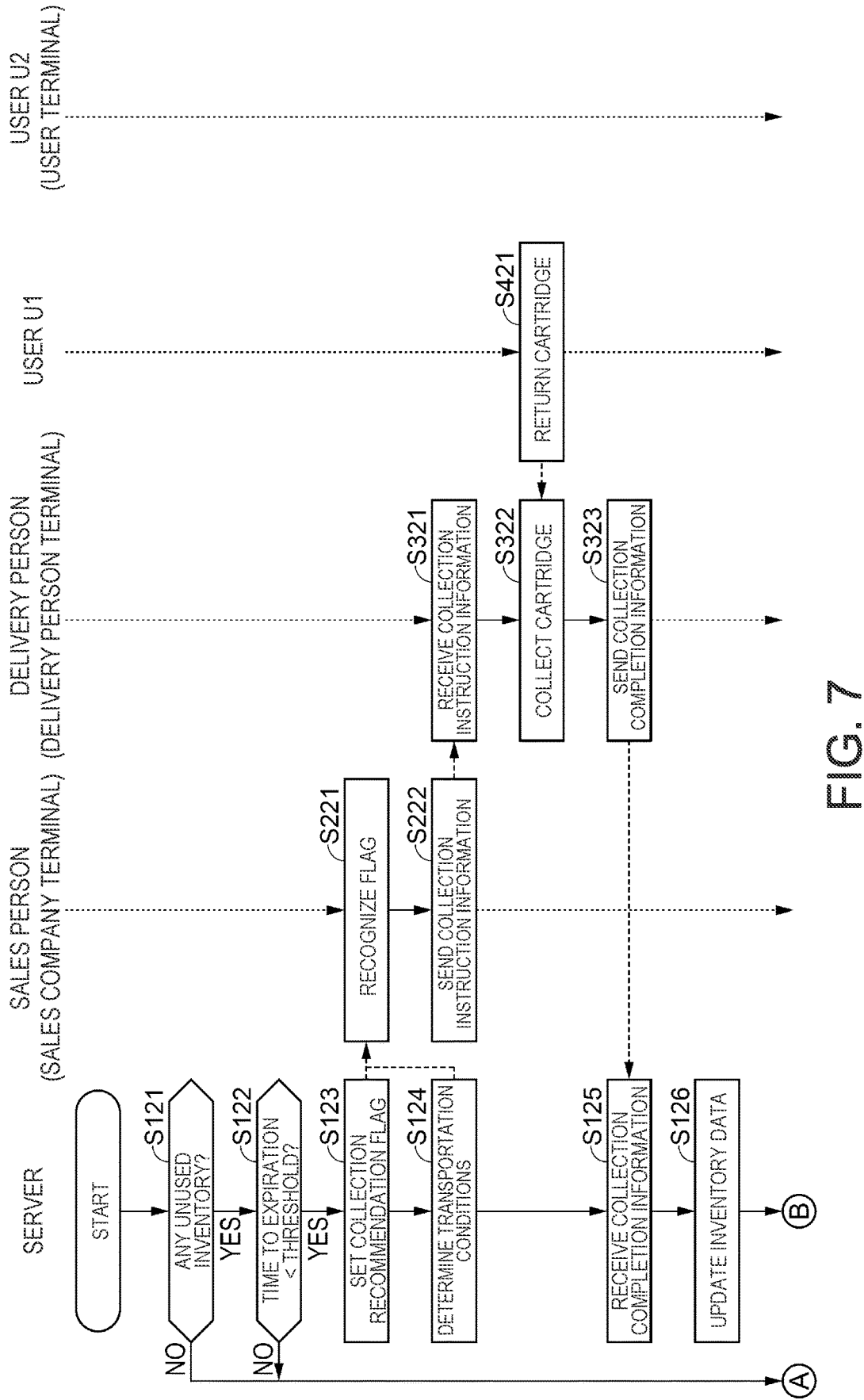
FIG. 7 is a flowchart for describing stock management processing.
Figure 8:
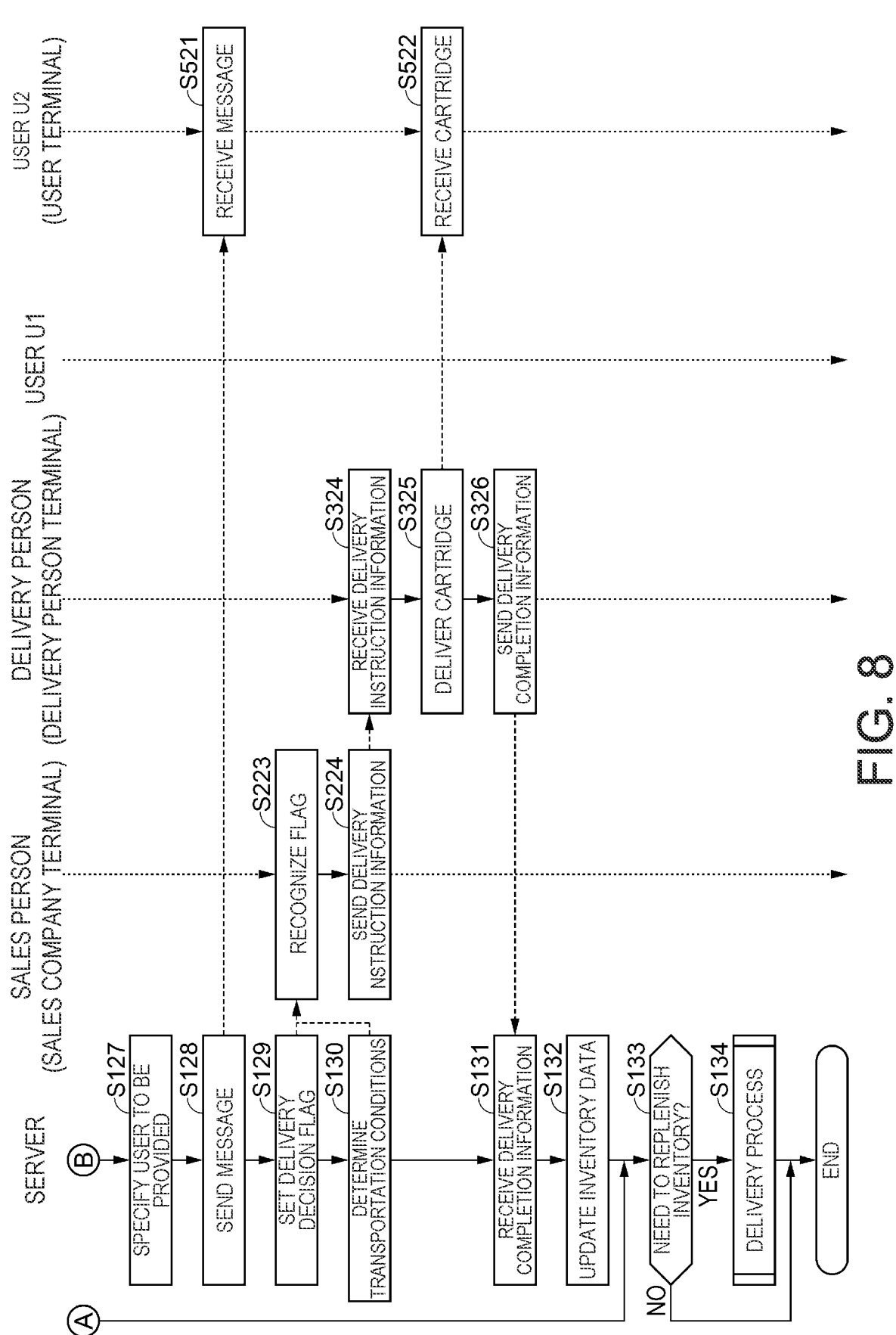
FIG. 8 is a flowchart for describing the stock management processing.

FIG. 7 and FIG. 8 are flowcharts for describing the stock management processing. These flowcharts include steps S121 to S134 indicating operations of the server 10, steps S221 to S224 indicating operations of the salesperson of the sales company and the sales company terminal 20, and steps S321 to S326 indicating operations of the person in charge of delivery at the delivery company and the delivery terminal 30. Further, of the plurality of users, the flowcharts include a step S421 indicating operations of the user U1, and steps S521 and S522 indicating operations of the user U2 and operations of the user terminal 40 of the user U2. The server control unit 11 of the server 10 starts the following flow when triggered to do so as a result of a current time, which is based on a time count by a timer (not illustrated), reaching a predetermined time on a predetermined date.

First, based on the user stock data 31 of all the users, the server control unit 11 determines whether there is an unused stock that remains unused for a predetermined period since the start of holding, in the stock of the cartridges 60 held by any of the users (step S121). Here, the predetermined period is set to a period shorter than a period from the time of manufacture to the usage expiry date of the cartridge 60. This predetermined period corresponds to a first period, and the unused stock corresponds to an unused recording material. When none of the users holds an unused stock (step S121: NO), the server control unit 11 moves the processing to step S133. The time of manufacture of the cartridge 60 is the time of manufacture of the liquid contained in the cartridge 60, the time when the cartridge 60 is filled with the liquid, or the like.

On the other hand, when any of the users holds an unused stock (step S121: YES), based on the usage expiry date of the cartridge 60 determined to be the unused stock, the server control unit 11 determines whether a period from a current time, namely, from a point in time at which the determination of the unused stock is made, to the usage expiry date is less than a predetermined threshold value TH1 (step S122). Here, the threshold value TH1 corresponds to a first threshold value. Here, the user having a relatively large usage amount tends to use up one cartridge 60 in a shorter period than the user having a relatively small usage amount. Thus, for example, the threshold value TH1 is set to a value shorter than a period UP1 required for the user having a relatively small usage amount to use up one cartridge 60, and longer than a period UP2 required for the user having a relatively large usage amount to use up one cartridge 60. In this case, the period UP1 is set to be longer than the period UP2. Specifically, for example, when the period UP1 required for the user having a relatively small usage amount to use up one cartridge 60 is three months, and the period UP2 required for the user having a relatively large usage amount to use up one cartridge 60 is one month, the threshold value TH1 is two months. When, for any of the unused stock, the period until the usage expiry date is equal to or longer than the threshold value TH1 (step S122: NO), the server control unit 11 moves the processing to step S133.

On the other hand, when, for any of the unused stock, the period until the usage expiry date is less than the threshold value TH1 (step S122: YES), the server control unit 11 sets, in the user stock data 31 of the user holding the corresponding cartridge 60, a collection recommendation flag in the data indicating the corresponding cartridge 60, that is, in the record (step S123). The collection recommendation flag is a flag indicating that, when the same user (the user having a relatively small usage amount) continues to hold the cartridge 60, this is the cartridge having a high likelihood of reaching the usage expiry date without being used. In other words, the collection recommendation flag indicates that there is the cartridge 60 of which reuse is recommended, by the sales company collecting the cartridge 60 from the user having a relatively small usage amount, and delivering the collected cartridge 60 to the user having a relatively large usage amount. In the following description, it is assumed that the user holding the cartridge 60 to which the collection recommendation flag is set is the user U1. In this case, user U1 corresponds to a first user.

Next, in a similar manner to step S113 described above, the server control unit 11 determines the transportation condition when collecting the cartridge 60 (step S124), and assigns the identifier indicating the transportation condition to the cartridge 60 to which the collection recommendation determination flag is set in the user stock data 31 of the user U1. Subsequently, the server control unit 11 transmits a notification, to the sales company terminal 20, indicating that the collection recommendation flag has been set.

Based on the notification from the server 10, the salesperson recognizes that the collection recommendation flag has been set, that is, that there is the cartridge 60 to be collected (step S221). Then, the salesperson accesses the server 10 from the sales company terminal 20, and selects the cartridge 60 to which the collection recommendation flag has been set, that is, the cartridge 60 that is the collection target, from the user stock data 31 of all the users. Then, the identification information of the cartridge 60 that is the collection target, the identifier indicating the transportation condition, and the identifier of the user holding the cartridge 60 that is the collection target are acquired, and collection instruction information based on the acquired information is transmitted from the sales company terminal 20 to the delivery terminal 30 (step S222).

When the delivery terminal 30 receives the collection instruction information from the sales company terminal 20 (step S321), the person in charge of delivery goes to the location of the user U1 and collects the cartridge 60 that is the collection target from the user U1 (step S322). In other words, the user U1 returns the cartridge 60 that is the collection target to the sales company, via the person in charge of delivery (step S421). The person in charge of delivery transports the collected cartridge 60 in accordance with the specified transportation condition and returns the cartridge 60 to the warehouse of the sales company, and subsequently transmits, from the delivery terminal 30 to the server 10, collection completion information indicating that the collection of the cartridge 60 is completed (step S323).

When the server 10 receives the collection completion information from the delivery terminal 30 (step S125), the server control unit 11 updates the user stock data 31 of the user U1, and the vendor stock data 22 (step S126).

Specifically, the server control unit 11 updates the user stock data 31 by deleting the collected cartridge 60 from the user stock data 31 of the user U1. Further, the server control unit 11 updates the vendor stock data 22 by adding the collected cartridge 60 to the vendor stock data 22.

Since the collected cartridge 60 has a short period until the usage expiry date, the collected cartridge 60 may be utilized by another of the users having a large usage amount. Thus, the server control unit 11 specifies the user that should be provided with the collected cartridge 60, that is, the cartridge 60 to which the collection recommendation flag has been set, based on the user stock data 31, the usage amount data 32, and the location data 33 of all the users (step S127). For example, the server control unit 11 specifies the user having a relatively small stock amount, of the users having a relatively large usage amount for the same type of liquid as that of the collected cartridge 60, as the provision destination user. Further, when there is a plurality of the users having substantially the same usage amount or stock amount, the user having location of which the distance from the warehouse is relatively short is specified as the provision destination user, for example. In the following description, it is assumed that the user U2 different from the user U1 is specified as the provision destination user. In this case, the user U2 corresponds to a second user.

When the provision destination user is specified, the server control unit 11 transmits, to the user terminal 40 of the user U2 that is the specified user, a message indicating the presence of the unused stock that can be provided to the user U2, and indicating that this unused stock is to be sent (step S128). When the user terminal 40 of the user U2 receives this message (step S521), the user U2 recognizes that the cartridge 60 having a short period until the usage expiry date is to be delivered in the near future.

Further, in the vendor stock data 22, the server control unit 11 sets, for the collected cartridge 60, the delivery determination flag indicating that this is the cartridge 60 to be delivered (step S129), and assigns the identifier indicating the specified provision destination user.

Next, in a similar manner to step S113, the server control unit 11 determines the transportation condition when delivering the cartridge 60 (step S130), and assigns the identifier indicating the transportation condition to the cartridge 60 to which the delivery determination flag is set in the vendor stock data 22. Subsequently, the server control unit 11 transmits a notification, to the sales company terminal 20, indicating that the delivery determination flag has been set.

Based on the notification from the server 10, the salesperson recognizes that the delivery determination flag has been set, that is, that there is the cartridge 60 to be delivered (step S223). Then, the salesperson accesses the server 10 from the sales company 20, acquires from the vendor stock data 22 the identification information of the cartridge 60 to which the delivery determination flag is set, the identifier indicating the user at the delivery destination, and the identifier indicating the transportation condition, and, based on the acquired information, transmits the delivery instruction information from the sales company terminal 20 to the delivery terminal 30 (step S224).

When the delivery terminal 30 receives the delivery instruction information from the sales company terminal 20 (step S324), the person in charge of delivery delivers the cartridge 60 that is the delivery target, to the user U2 (step S325). Specifically, the person in charge of delivery receives, from the warehouse of the sales company, the cartridge 60 collected from the user U1, and delivers the cartridge 60 to the location of the user U2 in accordance with the specified transportation condition. The user U2 receives the delivered cartridge 60 from the person in charge of delivery (step S522), and stores the cartridge 60 in a predetermined place as stock. When the delivery is completed, the person in charge of delivery transmits the delivery completion information indicating that the delivery to the user U2 is completed, from the delivery terminal 30 to the server 10 (step S326).

When the server 10 receives the delivery completion information from the delivery terminal 30 (step S131), the server control unit 11 updates the vendor stock data 22, and the user stock data 31 of the user U2 (step S132). Specifically, the server control unit 11 updates the vendor stock data 22 by deleting the cartridge 60 delivered to the user U2 from the vendor stock data 22. Further, the server control unit 11 adds the delivered cartridge 60 to the user stock data 31 of the user U2, and inputs the delivery date of the cartridge 60 as the holding start date of the cartridge 60, thereby updating the user stock data 31.

Subsequently, based on the user stock data 31 and the usage amount data 32 of all the users including the user U1 from which the cartridge 60 has been collected, the server control unit 11 determines whether replenishment of the stock is necessary at any of the users (step S133). Then, when there is the user that needs to have the stock replenished, that is, when there is the user that holds a small stock amount relative to the recent usage amount (step S133: YES), delivery processing (step S134) is executed and the flow is ended. This delivery processing is identical to the delivery processing executed at step S105. On the other hand, when there is no user that needs to have the stock replenished (step S133: NO), the flow ends without performing the delivery processing. The server control unit 11 regularly executes the flow at step S121 to step S134 at a predetermined interval. However, the flow at step S121 to step S134 may be executed irregularly with a specific event as a trigger.

As described above, when it becomes necessary to replace the cartridge 60, each of the users selects one of the cartridges of the same type as the cartridge 60 that is the replacement target from the stock held by the user, and mounts the selected cartridge to the printer 50. At this time, since the price of the cartridge 60 having the shorter period until the usage expiry date is set to be lower, the user proactively selects the cartridge 60 having the shorter period until the usage expiry date. In particular, since the cartridge 60 delivered as the unused stock has a short period until the usage expiry date, this cartridge 60 is likely to become a usage target immediately after delivery.

Although not illustrated in FIG. 5, when the cartridge 60 is replaced by the user and the replacement information is transmitted from the printer 50 to the server 10, based on the timing at which the replacement information is received, that is, the timing at which the use of the new cartridge 60 is started, and on the price data 23 stored in the server storage unit 12, the server control unit 11 determines the price of the cartridge 60 that has started to be used, and charges the user. The same applies to when the user U2 uses the unused stock collected from the user U1. However, in the price data 23, a setting may be made such that the price of the normal cartridge 60 is different from the price of the unused stock.

Specifically, with respect to the cartridges 60 having the same usage expiry date, if the price of the unused stock is set to be lower than the price of the normal cartridge 60, it is possible to promote the use of the unused stock, and it is possible to reduce the number of the cartridges 60 that are wastefully discarded.

According to the above-described embodiment, the following advantages can be obtained.

(1) According to the embodiment, the server 10 manages not only the stock held by the sales company but also the stock held by the user, and each item in stock is associated with the usage expiry date. Thus, when the cartridge 60 is provided to the user, it is possible to determine, in accordance with the stock amount of the stock held by the user and the respective usage expiry dates, the cartridge 60 of which usage expiry date should be provided from among the stock held by the sales company. As a result, it is possible to suppress a situation in which the stock having a short period until the usage expiry date becomes concentrated at a particular user or the like, and thus reduce the number of the cartridges 60 that are wastefully discarded without being used up before the usage expiry date.

(2) According to the embodiment, since the server 10 determines, based on the usage amount data 32 indicating the usage amount of the cartridge 60, the cartridge 60 of which usage expiry date should be provided from among the stock held by the sales company, it is possible to reduce the number of the cartridges 60 that are wastefully discarded, by providing the stock having a short period until the usage expiry date to the user having a large usage amount.

(3) According to the embodiment, since the server 10 updates the vendor stock data 22 and the user stock data 31 after it is confirmed that the delivery of the cartridge 60 to the user or the collection of the cartridge 60 from the user is completed, inaccuracy of the vendor stock data 22 and the user stock data 31 due to a delivery error or the like is suppressed.

(4) According to the embodiment, in the vendor stock data 22, since the identifier indicating the transportation condition is assigned to the cartridge 60 to be delivered or collected, it is possible to instruct the appropriate transportation condition to the person in charge of delivery.

(5) According to the embodiment, since the server 10 sets, in the user stock data 31, the collection recommendation flag to the cartridge 60 having a short period until the usage expiry date from among the unused stock that remains unused for a long time, it is possible to easily specify the cartridge 60 that should be collected for utilization by the other users or the like, and it is possible to reduce the number of the cartridges 60 that are wastefully discarded.

(6) According to the embodiment, the server 10 specifies, based on the usage amount data 32, the user that should be provided with the unused stock having the collection recommendation flag set thereto. Thus, the unused stock can be utilized by the user having a large recent usage amount, and it is possible to reduce the number of the cartridges 60 that are wastefully discarded.

(7) According to the embodiment, since the price of the cartridge 60 is determined in accordance with the time elapsed from the time when the cartridge 60 was manufactured, it is possible to promote the use of the cartridge 60, even when it is an unused stock for which a long time has elapsed from the time when the cartridge 60 was manufactured.

(8) According to the embodiment, since the user that should be provided with the unused stock having the collection recommendation flag set thereto is specified based on the location data 33, the unused stock can be utilized by the user having a closer location, that is, by the user that does not require a long time to deliver, and it is possible to reduce the number of the cartridges 60 that are wastefully discarded.

(9) According to the embodiment, when the cartridge 60 is provided to the user, the server 10 determines, based on the location of the user, the cartridge 60 of which usage expiry date should be provided from among the stock held by the sales company. Thus, it is possible to suppress a situation in which the cartridge 60 having a short period until the usage expiry date is delivered to the user that has a faraway location and that requires a long time to deliver, and thus reduce the number of the cartridges 60 that are wastefully discarded.

(10) According to the embodiment, since the server 10 transmits to the user U2 the message indicating that there is an unused stock that can be provided to the user U2, it is possible to make the user U2 aware of that fact.

2. Second Embodiment

The cartridge supply system 1 of this embodiment differs from that of the first embodiment in terms of the operation for setting the collection recommendation flag. The other configurations and operations are the same as those of the first embodiment, and a description thereof is thus omitted.

The cartridge providing system 1 of the embodiment first selects the cartridge 60 having a relatively short period until the usage expiry date, based on the user stock data 31 of all the users. Then, when the usage amount of the cartridge 60 by the user holding this cartridge 60 is relatively small, the collection recommendation flag is set to the selected cartridge 60. In other words, even if the period until the usage expiry date of the cartridge 60 is relatively short, the collection recommendation flag is not set to the selected cartridge 60 when the usage amount of the cartridge 60 by the user holding the cartridge 60 is relatively large.

Figure 9:
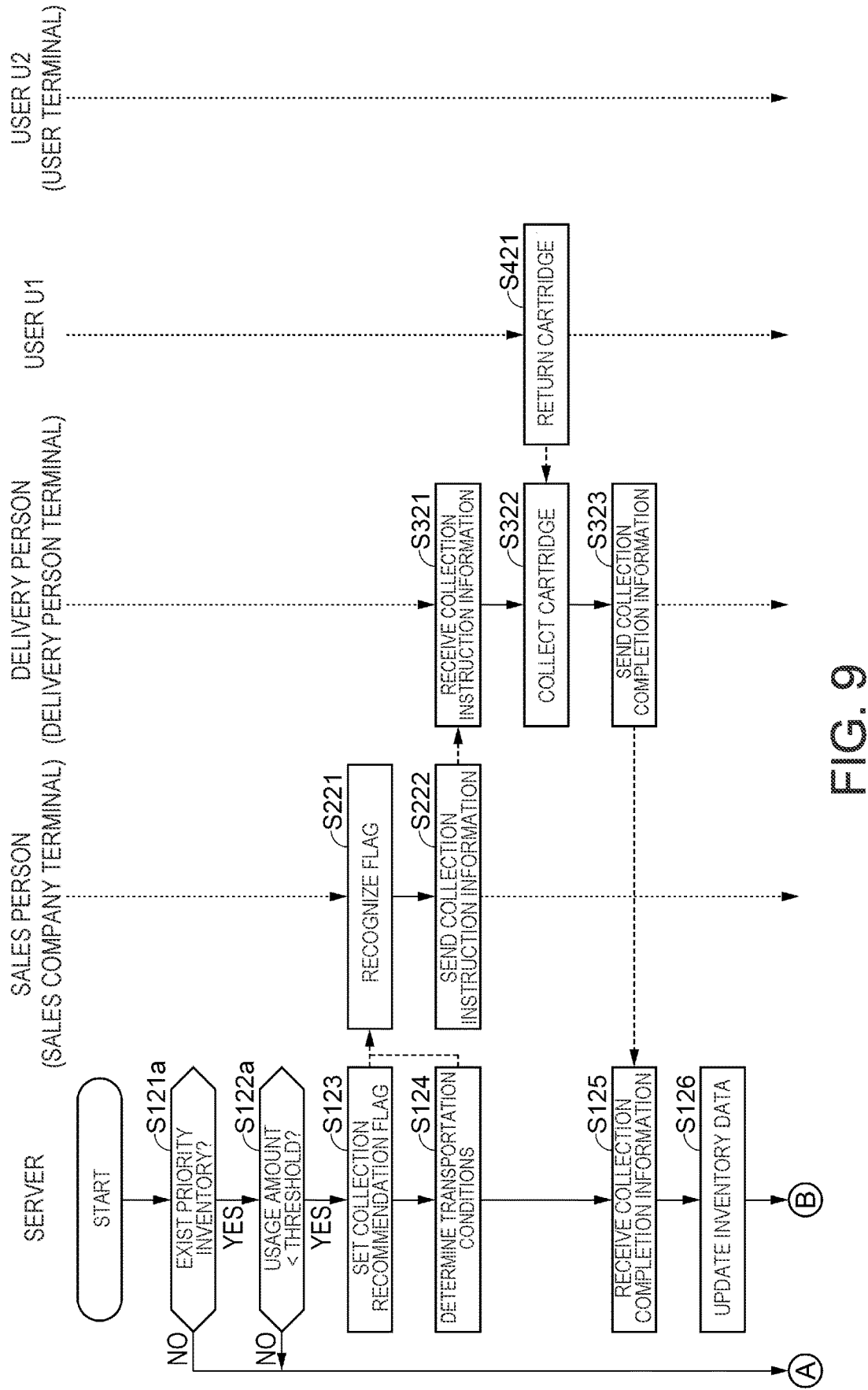
FIG. 9 is a flowchart for describing stock management processing according to a second embodiment.

FIG. 9 is a flowchart for illustrating the stock management processing according to the second embodiment. In a similar manner to the first embodiment, for example, the server control unit 11 starts the following flow when triggered to do so as a result of the current time reaching a predetermined time on a predetermined date.

As illustrated in FIG. 9, first, based on the user stock data 31 of all the users, the server control unit 11 determines whether, in the stock held by any of the users, there is the cartridge 60 of which the period from the current time to the usage expiry date is less than the predetermined value TH1, that is, whether there is a priority stock that should be preferentially used (step S121*a*). The priority stock corresponds to a priority recording material. When none of the users holds a priority stock (step S121*a*: NO), the server control unit 11 moves the processing to step S133 (see FIG. 8).

On the other hand, when any of the users holds a priority stock (step S121*a*: YES), the server control unit 11 determines, based on the usage amount data 32 of the user holding the priority stock, whether the usage amount of the cartridge 60 of the same type as the cartridge 60 determined to be the priority stock, that is, the number of the cartridges 60 used per month, is less than a predetermined threshold value TH2 (step S122*a*). Here, when a period required for the user holding the priority stock to use up the cartridges 60 of the same type as the priority stock is approximately the same as the threshold value TH1, it is assumed that it will be difficult for the user to use up the cartridge 60 that is the priority stock by the usage expiry date, on top of using up the mounted cartridge 60, namely, the cartridge 60 that is of the same type as the priority stock and that is already mounted to the printer 50. On the other hand, when the period required for the user holding the priority stock to use up the cartridges 60 of the same type as the priority stock is half or less than half of the threshold value TH1, it can be assumed that it is possible for the user to use up the cartridge 60 that is the priority stock by the usage expiry date, on top of using up the mounted cartridge 60. In other words, when the usage amount per period corresponding to the threshold value TH1 is two or more, or when the number of times of replacement is two or more, it is possible to use up the priority stock, and thus, the threshold value TH2 to be compared with the actual usage amount per month can be set to a value obtained by dividing "2" by the threshold value TH1, for example. Specifically, when the threshold value TH1 is one month, the threshold value TH2 is set to "2", and when the threshold value TH1 is two months, the threshold value TH2 is set to "1". The threshold value TH2 corresponds to a second threshold. When the usage amount of the user holding the priority stock is equal to or greater than the threshold value TH2 (step S122*a*: NO), the server control unit 11 moves the processing to step S133 (see FIG. 8). Note that, in the above description, the value of the number of the cartridges 60 used in the period corresponding to the threshold value TH1 is the same as the value of the number of times of replacement, but the configuration is not limited to this example. For example, when the calculation method is employed in which the number of times of replacement is one when the two cartridges 60 are used, the threshold value TH2 may be set to "1" when the above-described threshold value TH1 is one month.

On the other hand, when the usage amount of the user holding the priority stock is less than the threshold value TH2 (step S122*a*: YES), the server control unit 11 sets the collection recommendation flag to the corresponding cartridge 60, in the user stock data 31 of the user holding the corresponding cartridge 60 (step S123). Here, when the user holding the cartridge 60 to which the collection recommendation flag is set is the user U1, the user U1 corresponds to the first user. Operations thereafter are the same as those of the first embodiment and a description thereof will thus be omitted.

According to the above-described embodiment, the following advantages can be obtained.

(1) According to the embodiment, the server 10 sets the collection recommendation flag to the priority stock of which the period until the expiry date is short when the usage amount of the user holding the priority stock is less than the threshold value TH2. Thus, it is possible to easily specify the cartridge 60 that should be collected for utilization by another of the users or the like, and it is possible to reduce the number of the cartridges 60 that are wastefully discarded.

(2) According to the embodiment, since the server 10 specifies, based on the usage amount data 32, the user that should be provided with the priority stock having the collection recommendation flag set thereto, the priority stock can be utilized by the user having a large usage amount, and it is thus possible to reduce the number of the cartridges 60 that are wastefully discarded.

The above-described embodiments may be modified as follows.

In the above-described embodiments, the number of times of replacement of the cartridge 60 per month is used as the usage amount data 32 representing the usage amount of the liquid within a certain period. However, the certain period may be longer or shorter than one month. Further, the usage amount data 32 is not limited to the number of times of replacement of the cartridge 60, and may be the weight or volume of the used liquid. For example, as usage amount information, the server 10 can regularly or irregularly acquire the usage amount of the liquid stored in the memory 61 of the cartridge 60, from the printer 50 via the network NW, and use the acquired usage amount as the usage amount data 32. Alternatively, the server 10 may acquire the usage amount from the printer 50 when the printer control unit 51 updates the usage information of the memory 61 after the liquid of the cartridge 60 is used in the printer 50. Note that this usage amount may be calculated based on a droplet diameter and a number of ejections determined by the print data, or may be derived based on a weight change of the cartridge 60. Further, the server 10 can calculate the number of times of replacement of the cartridge 60 based on the usage amount acquired from the printer 50, and update the user stock data 31.

In the above-described embodiment, each of the cartridges 60 stored as stock is registered in the vendor stock data 22 and the user stock data 31 so as to be identifiable by the identification information, but the configuration is not limited to this mode. The number of the cartridges 60 for each of the usage expiry dates may be recorded in the data.

In the above-described embodiments, the vendor stock data 22 and the user stock data 31 are stored in the server storage unit 12 of the server 10, but the configuration is not limited to this mode. For example, the vendor stock data 22 may be stored in the sales company terminal 20, and the user stock data 31 may be stored in the user terminal 40.

In this case, the server control unit 11 of the server 10 may perform at least one of referral or updating, that is, may manage the vendor stock data 22 stored in the sales company terminal 20, via the network NW. In other words, the server 10 may access the vendor stock data 22 stored in the sales company terminal 20, via the network NW. In a similar manner, the server control unit 11 of the server 10 may perform at least one of referral or updating, that is, may manage the user stock data 31 stored in the user terminal 40, via the network NW. In other words, the server 10 may access the user stock data 31 stored in the user terminal 40, via the network NW.

Furthermore, in this case, the server control unit 11 of the server 10 may acquire the initial data of the user stock data 31 by accessing the user stock data 31 via the network NW.

In the above-described embodiments, the server control unit 11 determines the transportation condition when the cartridge 60 is delivered, based on the type of the cartridge 60, the timing of the delivery, the location of the user that is the delivery destination, and the period until the usage expiry date of the cartridge 60 to be delivered. However, in addition to these, the transportation condition may be determined based on the weather at the location of the user that is the delivery destination, or traffic conditions to the location of the user. In other words, the transportation condition may be determined based on at least one of the type of the cartridge 60, the delivery timing, the location of the user, the period until the usage expiry date, the weather at the location, or the traffic conditions to the location. This makes it possible to perform the delivery under transportation conditions suitable for various environments, and also makes it possible to suppress deterioration in quality of the liquid caused by the delivery.

In the above-described embodiments, the salesperson transmits the delivery instruction information and the collection instruction information from the sales company terminal 20 to the delivery terminal 30 based on the delivery determination flag and the collection recommendation flag set by the server 10, but the configuration is not limited to this mode. For example, the server 10 may transmit the delivery instruction information and the collection instruction information to the delivery terminal 30 without going through the salesperson.

In the above-described embodiments, the cartridge 60 collected from the user U1 is returned to the warehouse of the sales company and is then delivered to the user U2. However, the cartridge 60 may be directly delivered to the user U2 without being returned to the warehouse.

In the above-described embodiments, the unused stock and the priority stock are collected from the user for the purpose of being utilized by another of the users having a large usage amount. However, the unused stock and the priority stock may be collected for the purpose of diverting the liquid in the collected cartridge 60 to an application different from the original application, or using the same as a material for producing another article. For example, in the case of a treatment liquid used when printing on fabric, the treatment liquid can be diverted to a cleaning liquid used for cleaning components, devices, and the like.

In the above-described embodiments, the server 10 specifies the user that should be provided with the collected cartridge 60, transmits the message to this user, and then sets the flag for instructing the delivery of the cartridge 60, but the present configuration is not limited to this mode. For example, a mode may be adopted in which the user that has received the message can refuse the delivery of the cartridge 60 based on future printing plans or the like. In this case, the server 10 may specify the user at another provision destination. On the other hand, a mode may be adopted in which the cartridge 60 is delivered without transmitting the message.

In the above-described embodiments, the server 10 determines whether the stock held by the user needs to be replenished. However, a mode may be adopted in which the user can request replenishment of the stock based on the future printing plans or the like.

In the above-described embodiments, the information transmitted from the server 10 to each of the terminal devices 20, 30, and 40 may be transmitted in the form of an electronic mail, but a mode may be adopted in which a specific application program executed on the terminal devices 20, 30, and 40 receives or displays the information. Further, when the server 10 functions as a WEB server, the information may be transmitted via a WEB page provided by the server 10. In a similar manner, the information transmitted from each of the terminal devices 20, 30, and 40 and the printer 50 to the server 10 may be received by the cartridge management program 21 executed by the server, or a mode may be adopted in which the information is acquired via a WEB page.

In the above-described embodiments, the person in charge of delivery that delivers or collects the cartridge 60 transmits the delivery completion information or the collection completion information to the server 10, but another person in charge at the delivery company may transmit the delivery completion information or the collection completion information, instead of the person in charge of delivery. Alternatively, the person in charge of delivery may transmit the delivery completion information or the collection completion information to the sales company terminal 20, and the salesperson may transmit these pieces of information to the server 10.

In the above-described embodiments, the server 10 may also be configured to serve as the sales company terminal 20. In this case, a server operation unit and a server display unit are coupled to the server 10. The server operation unit is constituted by a keyboard, a pointing device, and the like, receives an input operation performed by the salesperson, and transmits the input operation to the server control unit 11. The server display unit is constituted by a liquid crystal display, an organic EL display, or the like, and displays information based on the control of the server control unit 11 and the like.

In the above-described embodiments, the server 10 is not limited to the mode in which the server 10 is constituted by the single server, and may be a distributed type server constituted by a plurality of servers. For example, the server 10 may include a first server and a second server capable of executing various processing in cooperation with each other via the network NW. At this time, one of the first server or the second server may manage the vendor stock data 22 and the price data 23, and the other may manage the user data 24.

In the above-described embodiments, the two organizations of the sales company and the delivery company are involved in the delivery of the cartridge 60, but the configuration is not limited to this mode. For example, the functions of the two organizations may be performed by one organization. In this case, the sales company terminal 20 and the delivery terminal 30 may be the same terminal. Further, some of the functions of the two organizations may be performed by another organization, such as an agent.

In the above-described embodiments, the location data 33 indicating the location of each of the users may include the address of the location, and may include the name of an organization when the user is an organization such as a company or a school. Further, a distance or a route to the location from a predetermined place such as the warehouse in which the stock of a sales company is stored, a time required for the delivery, or the like may be included, or information indicating the latitude and the longitude of the location may be included.

In the above-described embodiments, a mode is illustrated in which the sales company has the ownership of the stock of the cartridges 60 held by the user, but a mode may be adopted in which the user has the ownership.

In the above-described embodiments, the printer 50 that is the recording device is a device that prints an image on a printing medium, and may be a serial printer, a lateral printer, a line printer, a page printer, or the like. Further, a printing method (recording method) is not limited to the inkjet method, and a thermal method, a dot-impact method, a laser method, or the like may be employed. The recording material is not particularly limited as long as it is suitable for each of the printing methods. For example, when the recording method is the laser method, the recording material is a liquid toner or a solid toner. Further, it is sufficient that the printer 50 has at least the printing function of printing on the printing medium, and may be a multifunctional device having a function other than the printing function. Furthermore, the printer 50 is not limited to a two-dimensional medium and may be a device that performs printing on a medium having a three-dimensional curved surface.

In the above-described embodiments, the printer 50 that is the liquid ejecting device is described as an example of the recording device, but the liquid ejecting device is not limited to the printer 50 as long as it is a device capable of ejecting a liquid. For example, the liquid ejecting device may be a pre-processing device or a post-processing device that ejects a predetermined processing liquid onto the printing medium as pre-processing or post-processing of the printing, or may be a liquid ejecting device used for an application other than printing.

Contents derived from the Embodiments will be described below.

A providing system includes a recording device configured to perform recording by applying a recording material to a medium, and a management device configured to manage provision of the recording material to a plurality of users that use the recording device. The management device manages user stock data for each of the plurality of users, the user stock data being data in which a stock of the recording material held by the plurality of users is associated with a usage expiry date of the recording material. The management device determines, based on the user stock data of each of the plurality of users, whether an unused recording material is present in the stock of the recording material held by each of the plurality of users, the unused recording material being the recording material remaining unused for a first period or longer from a start of holding of the recording material. In a case in which it is determined that the unused recording material is present in the stock of the recording material held by a first user of the plurality of users, when a period until a usage expiry date of the unused recording material is less than a first threshold value, the management device sets a collection recommendation flag to the unused recording material in the user stock data of the first user, the collection recommendation flag indicating the recording material recommended for collection.

According to this configuration, since the management device sets, in the user stock data, the collection recommendation flag to the recording material having a short period until the usage expiry date, of the unused recording material that remains unused for a long time, it is possible to easily specify the recording material that should be collected for utilization by another of the users, diversion to another application, or the like, and it is thus possible to reduce the amount of the recording material that is wastefully discarded.

In the above-described providing system, the management device may manage, for each of the plurality of users, usage amount data indicating a usage amount of the recording material in the recording device. When the collection recommendation flag is set to the unused recording material held by the first user, the management device may specify, based on the user stock data and the usage amount data, a second user, of the plurality of users, to be provided with the unused recording material to which the collection recommendation flag is set, the second user being different from the first user.

According to this configuration, since the management device specifies, based on the usage amount data, the second user that should be provided with the unused recording material having the collection recommendation flag set thereto, the unused recording material can be utilized by the user having a large usage amount, and it is thus possible to reduce the amount of the recording material that is wastefully discarded.

In the above-described providing system, the management device may manage price data associating a time elapsed from a time when the recording material was manufactured with a price of the recording material. When the unused recording material collected from the first user is used by the second user, the management device may determine a price of the unused recording material based on a timing at which the second user starts to use the unused recording material and on the price data.

According to this configuration, since the price of the recording material is determined in accordance with a time elapsed from the time when the recording material was manufactured, it is possible to promote the use of the unused recording material even when a long time has elapsed from the time when the recording material was manufactured.

In the above-described providing system, the management device may manage location data indicating a location of each of the plurality of users. When specifying the second user, the management device may specify the second user based on the location data in addition to the user stock data and the usage amount data.

According to this configuration, since the second user that should be provided with the unused recording material having the collection recommendation flag set thereto is specified based on the location data, the unused recording material can be utilized by the user having a close location, that is, the user that does not require a long time to deliver, and it is thus possible to reduce the amount of the recording material that is wastefully discarded.

In the above-described providing system, the management device may update the user stock data when delivery completion information is received from a deliverer delivering to the second user the unused recording material collected from the first user, the delivery completion information indicating that delivery of the unused recording material to the second user is completed.

According to this configuration, since the management device updates the user stock data after it is confirmed that the delivery of the unused recording material to the second user is completed, inaccuracy of the user stock data due to a delivery error or the like is suppressed.

In the above-described providing system, the management device may manage vendor stock data relating to a stock of the recording material held by a vendor providing the recording material to the plurality of users. The management device may determine a transportation condition to be used when the deliverer delivers the unused recording material to the second user, and assign to the vendor stock data an identifier indicating the determined transportation condition, in association with data indicating the unused recording material to be delivered.

According to this configuration, since, in the vendor stock data, the identifier indicating the transportation condition is assigned to the unused recording material to be delivered, it is possible to instruct the appropriate transportation condition to the deliverer.

A providing method is a providing method of providing a recording material to a plurality of users that use a recording device, the recording device being configured to perform recording by applying the recording material to a medium. The providing method includes managing user stock data for each of the plurality of users, the user stock data being data in which a stock of the recording material held by the plurality of users is associated with a usage expiry date of the recording material, determining, based on the user stock data of each of the plurality of users, whether an unused recording material is present in the stock of the recording material held by each of the plurality of users, the unused recording material being the recording material remaining unused for a first period or longer from a start of holding of the recording material, and, in a case in which it is determined that the unused recording material is present in the stock of the recording material held by a first user of the plurality of users, when a period until a usage expiry date of the unused recording material is less than a first threshold value, setting a collection recommendation flag to the unused recording material in the user stock data of the first user, the collection recommendation flag indicating the recording material recommended for collection.

According to this configuration, since the collection recommendation flag is set, in the user stock data, to the unused recording material having a short period until the usage expiry date, of the unused recording material that remains unused for a long time, it is possible to easily specify the recording material that should be collected for utilization by another of the users, diversion to another application, or the like, and it is thus possible to reduce the amount of the recording material that is wastefully discarded.

A management device is a management device for managing provision of a recording material to a plurality of users that use a recording device, the recording device being configured to perform recording by applying the recording material to a medium. The management device manages user stock data for each of the plurality of users, the user stock data being data in which a stock of the recording material held by the plurality of users is associated with a usage expiry date of the recording material. The management device determines, based on the user stock data of each of the plurality of users, whether an unused recording material is present in the stock of the recording material held by each of the plurality of users, the unused recording material being the recording material remaining unused for a first period or longer from a start of holding of the recording material. In a case in which it is determined that the unused recording material is present in the stock of the recording material held by a first user of the plurality of users, when a period until a usage expiry date of the unused recording material is less than a first threshold value, the management device sets a collection recommendation flag to the unused recording material in the user stock data of the first user, the collection recommendation flag indicating the recording material recommended for collection.

According to this configuration, since the collection recommendation flag is set, in the user stock data, to the unused recording material having a short period until the usage expiry date, of the unused recording material that remains unused for a long time, it is possible to easily specify the recording material that should be collected for utilization by another of the users, diversion to another application, or the like, and it is thus possible to reduce the amount of the recording material that is wastefully discarded.

What is claimed is:

1. A providing system comprising:

a recording device configured to perform recording by applying a recording material to a medium; and a management device configured to manage provision of the recording material to a plurality of users that use the recording device, wherein the management device manages user stock data for each of the plurality of users, the user stock data being data in which a stock of the recording material held by the plurality of users is associated with a usage expiry date of the recording material, the management device determines, based on the user stock data of each of the plurality of users, whether an unused recording material is present in the stock of the recording material held by each of the plurality of users, the unused recording material being the recording material remaining unused for a first period or longer from a start of holding of the recording material, and in a case in which it is determined that the unused recording material is present in the stock of the recording material held by a first user of the plurality of users, when a period until a usage expiry date of the unused recording material is less than a first threshold value, the management device sets a collection recommendation flag to the unused recording material in the user stock data of the first user, the collection recommendation flag indicating the recording material recommended for collection, the management device transmits to a sales company device a notification that the collection recommendation flag has been set, the management device manages, for each of the plurality of users, usage amount data indicating a usage amount of the recording material in the recording device, and the management device specifies a second user different from the first user, to whom the collected unused recording medium is delivered, based on the user stock data and the usage amount data of each of the plurality of users.

2. The providing system according to claim 1, wherein when the management device specifies the second user, the management device sets a delivery decision flag indicating the collected unused recording material for delivering to the second user.

3. The providing system according to claim 2, wherein the management device manages price data associating a time elapsed from a time when the recording material was manufactured with a price of the recording material and when the unused recording material collected from the first user is used by the second user, the management device determines a price of the unused recording material based on a timing at which the second user starts to use the unused recording material and on the price data.

4. The providing system according to claim 2, wherein the management device manages location data indicating a location of each of the plurality of users and when specifying the second user, the management device specifies the second user based on the location data in addition to the user stock data and the usage amount data.

5. The providing system according to claim 2, wherein the management device updates the user stock data when delivery completion information is received from a deliverer delivering to the second user the unused recording material collected from the first user, the delivery completion information indicating that delivery of the unused recording material to the second user is completed.

6. The providing system according to claim 5, wherein the management device manages vendor stock data relating to a stock of the recording material held by a vendor providing the recording material to the plurality of users, the management device determines a transportation condition to be used when the deliverer delivers the unused recording material to the second user, and the management device assigns to the vendor stock data an identifier indicating the determined transportation condition, in association with data indicating the unused recording material to be delivered.

7. A providing method of providing a recording material to a plurality of users that use a recording device, the recording device being configured to perform recording by applying the recording material to a medium, the providing method comprising:

managing user stock data for each of the plurality of users, the user stock data being data in which a stock of the recording material held by the plurality of users is associated with a usage expiry date of the recording material;

determining, based on the user stock data of each of the plurality of users, whether an unused recording material is present in the stock of the recording material held by each of the plurality of users, the unused recording material being the recording material remaining unused for a first period or longer from a start of holding of the recording material; and in a case in which it is determined that the unused recording material is present in the stock of the recording material held by a first user of the plurality of users, when a period until a usage expiry date of the unused recording material is less than a first threshold value:

setting a collection recommendation flag to the unused recording material in the user stock data of the first user, the collection recommendation flag indicating the recording material recommended for collection;

transmitting to a sales company device a notification that the collection recommendation flag has been set; and specifying a second user different from the first user, to whom the collected unused recording medium is delivered, based on the user stock data and usage amount data of each of the plurality of users, wherein the usage amount data indicating a usage amount of the recording material in the recording device is managed for each of the plurality of users.

8. A management device for managing provision of a recording material to a plurality of users that use a recording device, the recording device being configured to perform recording by applying the recording material to a medium, wherein the management device manages user stock data for each of the plurality of users, the user stock data being data in which a stock of the recording material held by the plurality of users is associated with a usage expiry date of the recording material;

the management device determines, based on the user stock data of each of the plurality of users, whether an unused recording material is present in the stock of the recording material held by each of the plurality of users, the unused recording material being the recording material remaining unused for a first period or longer from a start of holding of the recording material; and in a case in which it is determined that the unused recording material is present in the stock of the recording material held by a first user of the plurality of users, when a period until a usage expiry date of the unused recording material is less than a first threshold value:

the management device sets a collection recommendation flag to the unused recording material in the user stock data of the first user, the collection recommendation flag indicating the recording material recommended for collection;

the management device transmits to a sales company device a notification that the collection recommendation flag has been set; and specifying a second user different from the first user, to whom the collected unused recording medium is delivered, based on the user stock data and usage amount data of each of the plurality of users, wherein the usage amount data indicating a usage amount of the recording material in the recording device is managed for each of the plurality of users.

* * * * *